Sept. 28, 1948.  R. B. COTTON  2,450,328
AIRCRAFT BARRIER
Filed Jan. 16, 1946  4 Sheets-Sheet 3

INVENTOR.
ROBERT B. COTTON
BY
HIS ATTORNEY.

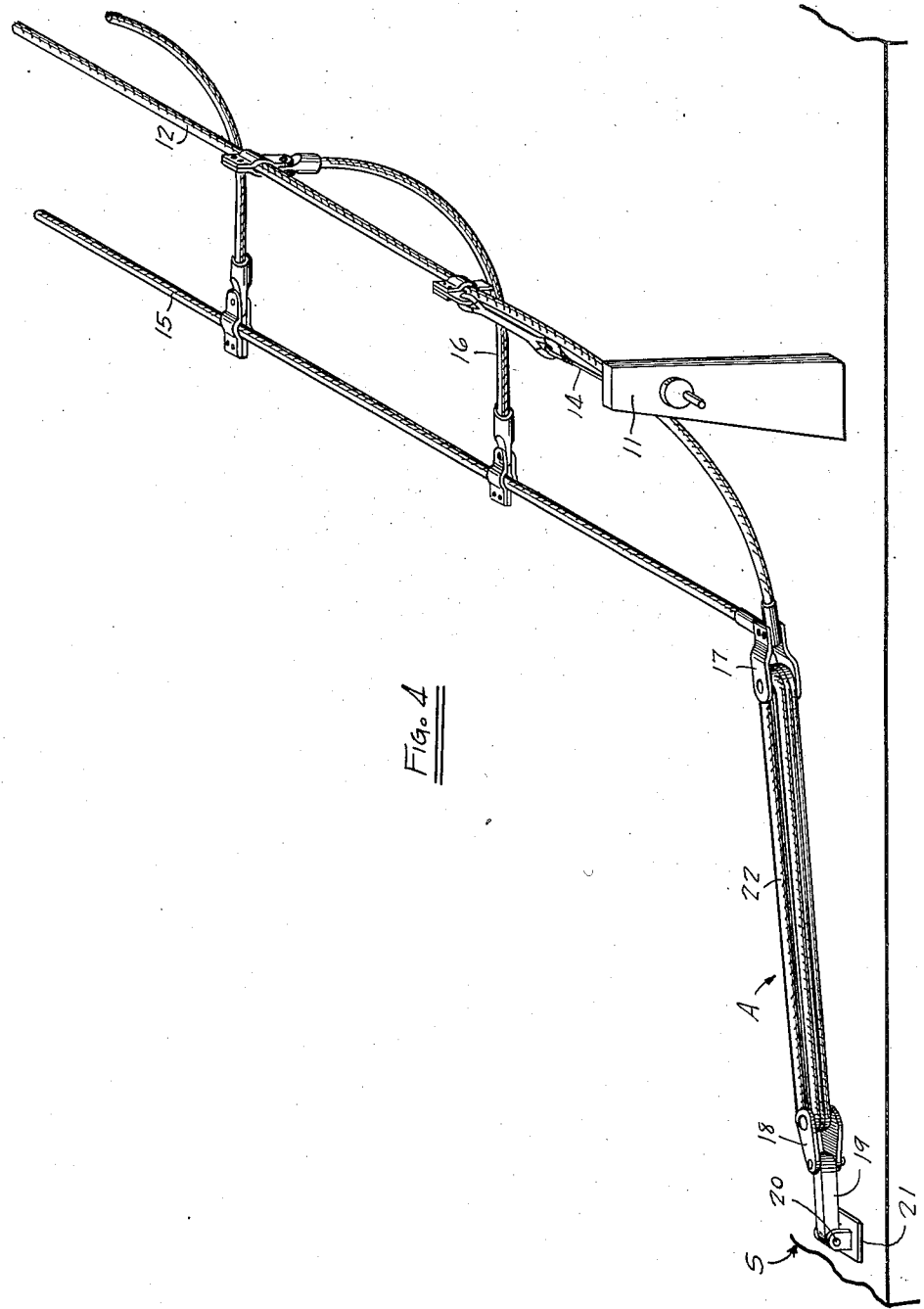

Patented Sept. 28, 1948

2,450,328

UNITED STATES PATENT OFFICE 2,450,328

AIRCRAFT BARRIER

Robert B. Cotton, Lansdowne, Pa., assignor to All American Aviation, Inc., a corporation of Delaware Application January 16, 1946, Serial No. 641,424

8 Claims. (Cl. 244—110)

The present invention relates to aircraft barriers and is concerned primarily with a barrier designed to engage a tricycle landing gear of an aircraft.

It is now well recognized by those dealing with the problems and conditions attending the landing and taking off of aircraft from restricted areas that there is a need for a barrier which will arrest an aircraft without causing serious injury thereto. Particular attention is called to the flight deck of an aircraft carrier as a good example of a place where there is a crying need for such a barrier. In providing a barrier which is adapted to be engaged by an aircraft under emergency conditions, the invention has particularly in mind the provision of a barrier which is adapted to engage the tricycle landing gear of an aircraft equipped with such landing gear.

The use of aircraft with tricycle landing gear is becoming more and more widespread, particularly with the heavier types of aircraft. Such landing gear is characterized by the presence of a leading or nose wheel which is out in front and a pair of rear wheels. With this wheel arrangement in mind and in view of the conditions above outlined, the invention has in view as its foremost objective the provision of a barrier which is designed to engage all of the wheels of a tricycle landing gear.

In carrying out this idea in a practicable embodiment, the barrier comprises an upper horizontal cable and a lower horizontal cable which may assume a trailing position with respect to the upper cable. The two are connected by cross lines. When an aircraft having a tricycle landing gear flies into such a barrier, the leading wheel ordinarily engages the top cable. This engagement, coupled with the arrangement used in mounting the barrier in effective position, causes the lower horizontal cable to be raised into a position in which it engages the rear wheels.

In providing an aircraft barrier of the type above discussed, it is highly important to provide for the gradual deceleration of the aircraft. It would avail but little to provide a barrier which is so rigid that the plane would be wrecked by the engagement therewith. Accordingly, the invention has as a further object the provision of an aircraft barrier of the character above noted which includes shock absorbing elements that are associated with the cable arrangement so as to decelerate the aircraft to a desired degree of acceleration.

The ability of undrawn nylon and other synthetic plastic fibers in their undrawn state to elongate and while elongating absorb energy is now well recognized. The present invention has as a further object the further provision of an aircraft barrier of the type above noted which includes shock absorbing elements in the form of undrawn synthetic plastic fibers. Particular objects and advantages in the invention are associated in the manner in which these shock absorbing elements are incorporated into a barrier structure.

In erecting a barrier of the character above noted in an effective position, it is important that the upper horizontal cable be maintained substantially taut. This is accomplished by stretching it between two anchoring posts. However, it is equally important that upon engagement by the leading wheel of the tricycle landing gear the ends of this cable be free of the anchoring posts. Accordingly, a further object in view is the provision in an aircraft barrier of this type of frangible means for stretching a cable between two posts. This means will have sufficient strength to normally maintain the cable taut, but will break with the impact of the leading wheel of the tricycle landing gear therewith, and free the cable so that it may undergo the desired action.

Various other more detailed objectives and advantages of the invention such as arise in connection with carrying out the above noted ideas in a practical embodiment will in part become apparent and in part be hereinafter stated as the description of the invention proceeds.

The invention, therefore, comprises an aircraft barrier particularly adapted for use in conjunction with aircraft having tricycle landing gears and which includes an upper horizontal cable, frangible means for maintaining said cable stretched between a pair of anchoring posts, a lower horizontal cable, vertical lines connecting said two cables, and shock absorbing elements effectively connected to said cable arrangement and which shock absorbing elements consist of synthetic plastic fibers in an undrawn condition and having the ability to draw and while drawing absorb energy.

For a full and more complete understanding of the invention, reference may be had to the following description and accompanying drawings wherein, Figure 1 is a perspective view somewhat diagrammatic, showing a barrier made in accordance with the precepts of this invention about to be engaged by an aircraft.

Figure 4 is a detailed perspective of one end of the barrier and develops particularly the cable arrangement.

Figure 1:
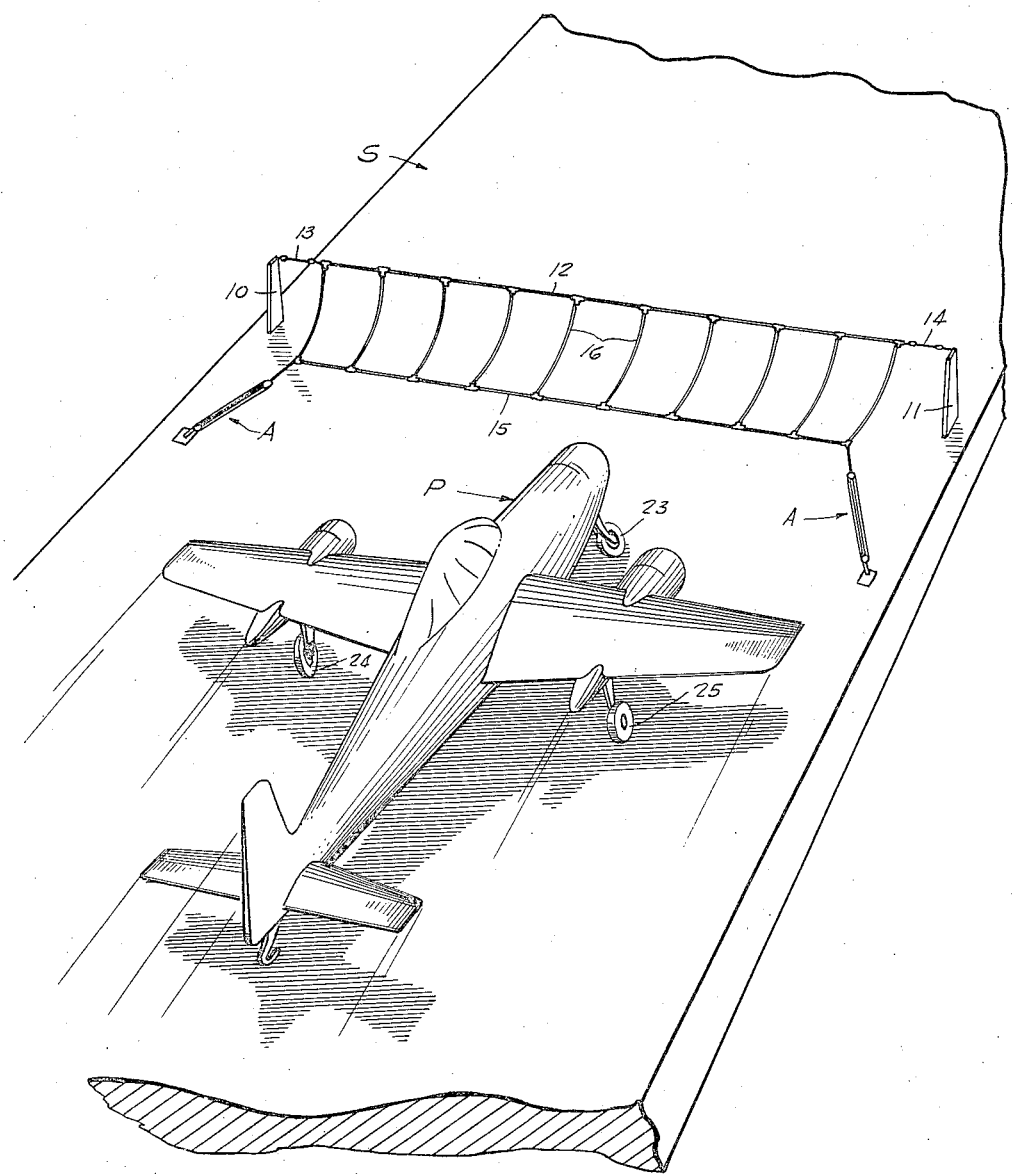
Figure 2:
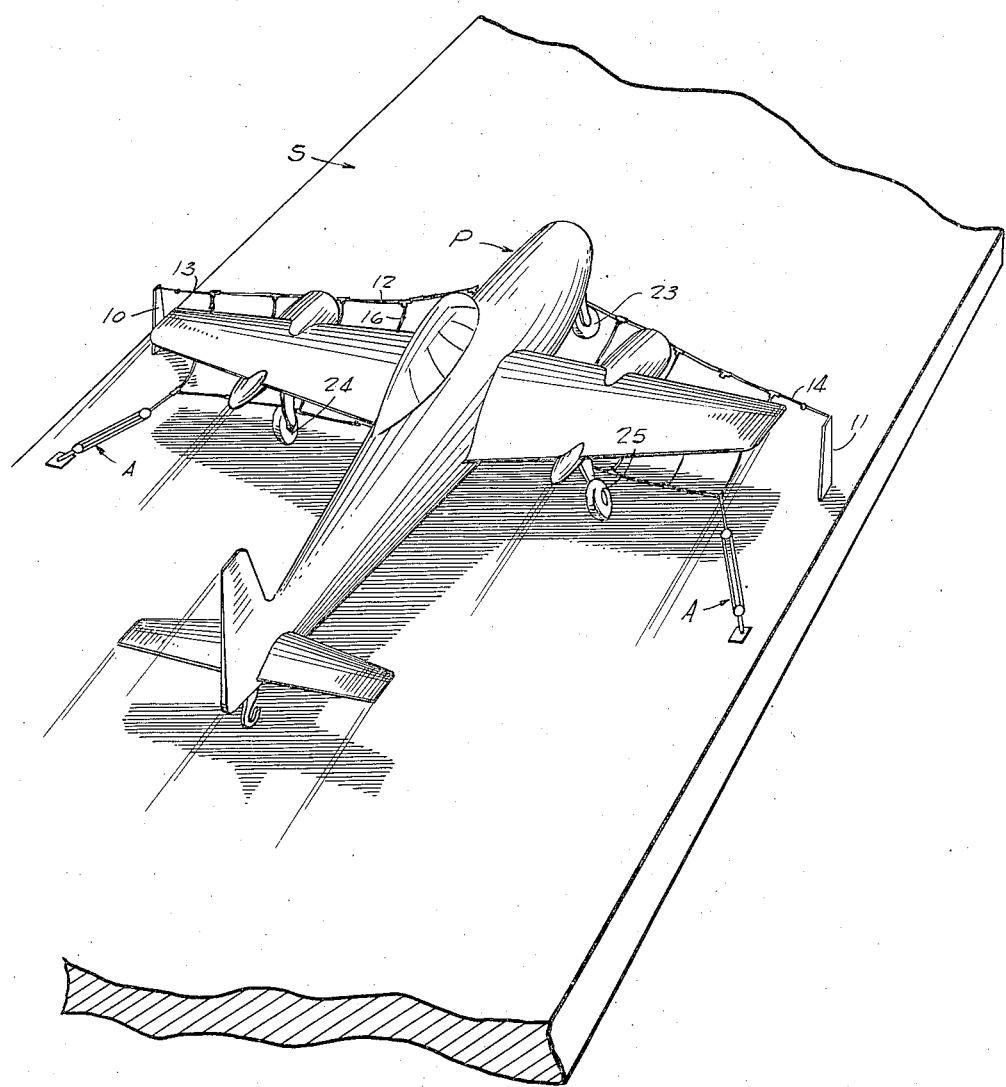
Figure 2 is a perspective view similar to Figure 1 showing the condition of the barrier immediately after engagement by the leading wheel.
Figure 3:
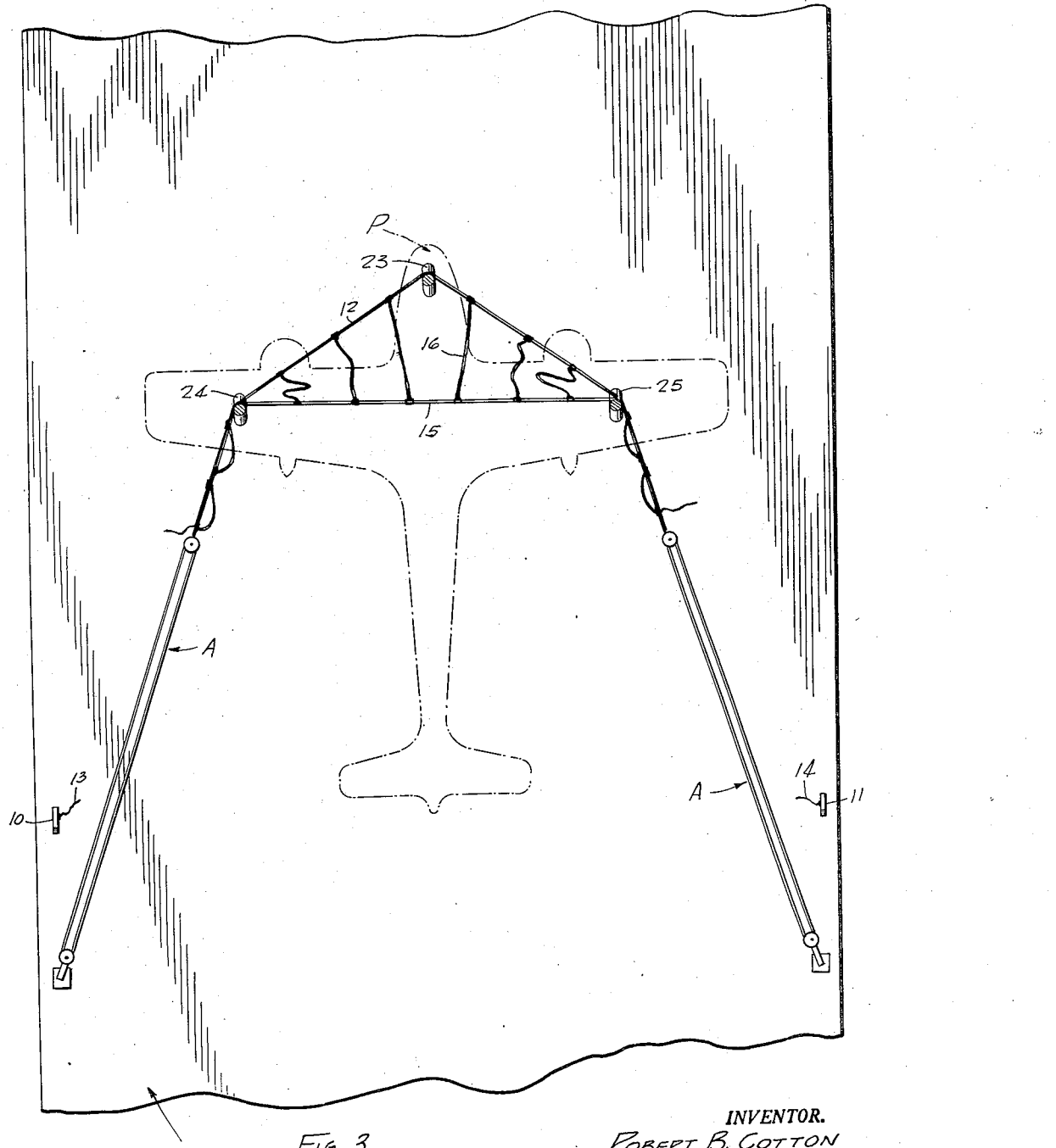
Figure 3 is a plan view with the aircraft shown in dotted lines. This view brings out the relation of the tricycle landing gear to the barrier in the fully engaged position

Referring now to the drawings wherein like reference characters denote corresponding parts, the surface on which the barrier is erected is identified by the reference character S. This surface may be the flight deck of an aircraft carrier or may be at any other location where the space available for the landing and taking off of aircraft is restricted. At an appropriate location on the surface of S are a pair of anchoring posts 10 and 11 which are spaced a required distance apart. These posts 10 and 11 may be erected in their upright position in any well-known manner. The particular means will, of course, depend on the nature of the surface S.

An upper horizontal cable is designated 12. At one end the cable 12 is connected to the post 10 by a frangible link 13, while a similar link 14 effects a corresponding connection of the other end of the cable to the post 11. It is evident that due to the presence of the frangible links 13 and 14 the upper cable 12 is stretched substantially taut between the upper ends of the posts 10 and 11. A lower cable 15 assumes a position substantially parallel to the upper cable 12 but preferably is in a horizontal plane below the level of cable 12 and offset therefrom with respect thereto, i. e. it is not directly beneath the cable 12 but is offset in the direction from which a plane is intended to approach the barrier.

A plurality of cross lines 16 extend between the cables 12 and 15. As is clearly shown in Figure 1, these lines 16 are spaced at appropriate intervals along the cables. The number of the lines 16 may be varied to suit the needs of any particular installation.

Thus, there is provided a barrier comprising elongated marginal cables 12 and 15 connected by cross lines 16, which assembly is supported so that the cable 12 is elevated along a horizontal plane above the offset horizontal plane of the cable 15. This is attained by the cooperative arrangement of the posts 10 and 11 and special shock absorbers and anchor members, hereinafter described.

At each side of the barrier installation there is a shock absorber element which is referred to in its entirety by the reference character A. These elements A are substantially duplicates and only one of them here needs be described for the purpose of this specification. As is more clearly shown in Figure 4, each lower corner of the cable arrangement includes a fitting in the form of a yoke 17. Another yoke 18 is connected to a link 19 which in turn is pivotally secured as indicated at 20 to an anchorage 21. The latter is effectively embedded within or secured to the surface S.

A loop of synthetic plastic fibers in their undrawn state is shown at 22 as being wound between the yokes 17 and 18. At the present time, there is known and available to the public certain synthetic plastic fibers which in their undrawn condition have the ability to draw and while drawing absorb energy. Among such synthetic plastic fibers are polyethylene, Vinyon, and Vinylite. However, the invention has particularly in mind the use of undrawn nylon as the preferred material from which the loops 22 are made. Nylon in its undrawn state has the ability to elongate in the neighborhood of six hundred percent and while so drawing absorb a large amount of energy. It is, therefore, particularly adapted to be the main member of one of the shock absorbing elements A.

Figure 1 depicts the condition of the barrier prior to engagement by an aircraft. The latter is designated generally P and includes a tricycle landing gear comprising a nose or lead wheel 23 and a pair of rear wheels 24 and 25. As the plane P comes into the barrier, the nose wheel 23 or rather the strut on which it is mounted engages the upper cable 12. The impact of this engagement breaks the frangible links 13 and 14 and the cable 12 is stretched forwardly. As it so stretches the catenary is removed from the cross lines 16 and this straightening out operation raises the lower cable 15 into a position in which it is engaged by the rear wheels 24 and 25. As the forward motion of the plane continues, the undrawn nylon loops 22 draw and gradually bring the aircraft to a stop. It is evident that with this arrangement the aircraft is engaged on the underside at three points and thus the likelihood of having the plane "nose over" is greatly reduced, if not substantially eliminated.

Obviously, the barrier above described is intended for emergency use only. After each use it will ordinarily be necessary to replace the loops 22 because once the nylon is drawn it will, of course, lose its ability to absorb the energy to the required degree.

While a preferred specific embodiment of the said invention is hereinbefore set forth it is to be clearly understood that the invention is not to be limited to the exact construction illustrated and described because various modifications of these details may be provided in putting the invention into practice within the purview of the appended claims.

What is claimed is:

1. In an aircraft barrier, upper and lower substantially horizontal cables, a plurality of cross members connecting said cables, support means for said upper cable, said lower cable being offset toward the approach side of a landing aircraft with respect to said upper cable. anchoring means, and a line of undrawn synthetic plastic fibers having one end secured to said anchoring means and the other end to said lower cable.

2. In an aircraft barrier, a flexible cable assembly comprising upper and lower cables normally mounted in offset relation, crossties connecting said cables at spaced points, a pair of spaced anchors, and a line of undrawn nylon connecting each anchor to the lower cable of the assembly.

3. In an aircraft barrier, a pair of spaced anchoring posts, an upper horizontal cable, frangible links connecting each end of said cable to its respective anchoring posts whereby said cable is maintained in a taut condition between said posts, a lower horizontal cable normally offset out of the vertical with respect to said upper cable, a plurality of crossties connecting said cables at spaced intervals, a pair of anchors spaced apart from each other and removed from said posts on the approach side of the barrier, and lines of undrawn synthetic plastic fibers connecting said anchors to said cables.

4. In an aircraft barrier, an upper horizontal cable adapted to engage the leading wheel of a tricycle landing gear, a lower horizontal cable normally offset out of the vertical with respect to said upper cable and adapted when raised by engagement with the leading wheel of the landing gear to engage the rear wheels of said tricycle landing gear, and means for interconnecting said cables whereby said engagement of said upper cable by said leading wheel raises said lower cable into a position in which it is engaged by said rear wheels.

5. In an aircraft barrier for tricycle landing gear, the combination of upper and lower horizontally mounted cables, means for supporting the same in offset relation prior to impact with an aircraft, said lower cable being mounted toward the approach side of an incoming aircraft, and means connecting said cables adapted to impart raising motion to said lower cable after impact with the upper cable of the leading wheel of the tricycle landing gear as the forward motion of a landing aircraft carrying such landing gear decelerates.

6. In an aircraft barrier for tricycle landing gear, the combination of upper and lower horizontally mounted cables, means for supporting the same in offset relation prior to impact with an aircraft, said lower cable being mounted toward the approach side of an incoming aircraft, means connecting said cables adapted to impart raising motion to said lower cable after impact with the upper cable of the leading wheel of the tricycle landing gear as the forward motion of a landing aircraft carrying such landing gear decelerates, and a line of undrawn nylon connecting each end of the lower cable to the landing surface extending from the approach side of the barrier.

7. A barrier for landing aircraft on a restricted surface comprising marginal longitudinal cables connected together, frangible means adapted to normally hold one of said marginal cables taut in a substantially horizontal plane above the level of the other cable, and means for decelerating the forward motion of a landing aircraft coupled to each end of the said other lower marginal cable and anchored to the said landing surface forward of the said supports on the approach side of the barrier.

8. A barrier for stopping landing aircraft on landing surfaces of restricted area, comprising marginal cables connected together by cross lines, support means adapted to selectively position said marginal cables above the said landing surface in substantially offset upper and lower horizontal planes, one above the other, for engagement first with the nose wheel and then with the rear wheels of a tricycle type landing gear, replaceable shock absorbing members coupled to the lower marginal cable, and frangible coupling means connected to the opposite ends of said upper marginal cable adapted to break from the impact of the nose wheel and forward motion of the aircraft, whereby pull is imparted by said cross lines to raise the lower cable into engagement with the rear wheels of the landing gear and said shock absorbing members are extended to decelerate the aircraft.

ROBERT B. COTTON.

REFERENCES CITED

The following references are of record in the file of this patent:

UNITED STATES PATENTS

| Number | Name | Date |
|--------|------|------|
| 702,275 | Arnold | June 10, 1902 |
| 1,428,163 | Harriss | Sept. 5, 1922 |
| 2,402,918 | Schultz | June 25, 1946 |